(12) United States Patent
Van De Kerkhof et al.

(10) Patent No.: US 11,536,300 B2
(45) Date of Patent: Dec. 27, 2022

(54) TROLLEY DETECTION AND SAFETY SYSTEM

(71) Applicant: GEA Food Solutions Bakel B.V., Bakel (NL)

(72) Inventors: Paulus Petrus Johannus Lambertus Van De Kerkhof, Helmond (NL); Petrus Johannes Adrianus Faber, Helmond (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 1092 days.

(21) Appl. No.: 16/076,119

(22) PCT Filed: Feb. 7, 2017

(86) PCT No.: PCT/EP2017/052591
§ 371 (c)(1),
(2) Date: Aug. 7, 2018

(87) PCT Pub. No.: WO2017/140527
PCT Pub. Date: Aug. 24, 2017

(65) Prior Publication Data
US 2021/0190104 A1    Jun. 24, 2021

(30) Foreign Application Priority Data

Feb. 15, 2016   (EP) ..................................... 16155656

(51) Int. Cl.
*B62B 5/00*     (2006.01)
*B62B 3/02*     (2006.01)
(Continued)

(52) U.S. Cl.
CPC ................ *F16B 2/185* (2013.01); *B62B 3/02* (2013.01); *B62B 5/0013* (2013.01); *B62B 5/04* (2013.01)

(58) Field of Classification Search
CPC ......... F16B 2/185; B62B 3/02; B62B 5/0013; B62B 5/04; B62B 5/00; B62B 5/0079;
(Continued)

(56) References Cited

U.S. PATENT DOCUMENTS 4,023,735 A  *  5/1977  Schnell .................. A22C 17/06
                                                      241/23
4,063,401 A  *  12/1977 Higgins ................... B65B 9/135
                                                      53/567
(Continued)

FOREIGN PATENT DOCUMENTS

CN         101128353 A  *  2/2008   .............. B62B 3/02
CN         104065700 A  *  9/2014   .............. A22C 18/00
(Continued)

OTHER PUBLICATIONS

Russian Office Action dated Apr. 23, 2020, for Russian Patent Application 2018130109.
(Continued)

*Primary Examiner* — James A Shriver, II
*Assistant Examiner* — Ian Bryce Shelton
(74) *Attorney, Agent, or Firm* — The Dobrusin Law Firm, P.C.

(57) ABSTRACT

This invention relates to a method to detect the connection between two food processing—, food-preparation and/or handling-devices (1, 2), wherein one device (1) comprises detection means (31) with a sensor (6) and sensor activation means (18). The invention further relates to a set with a first device (1) and a second food processing—, food preparation and/or handling device (2), which are reversibly connected wherein the first device (1) comprises a safety device (10, 20) with a sensor (6) and an activation means (18).

15 Claims, 7 Drawing Sheets

(51) Int. Cl.
*B62B 5/04* (2006.01)
*F16B 2/18* (2006.01)

(58) Field of Classification Search
CPC .... G06K 17/0022; G06K 17/00; A22C 18/00; B66B 31/006
See application file for complete search history.

(56) References Cited

U.S. PATENT DOCUMENTS

| | | | | |
|---|---|---|---|---|
| 4,351,541 | A * | 9/1982 | Propst | B60D 1/02 |
| | | | | 105/1.4 |
| 5,050,651 | A * | 9/1991 | Hejlesen | B65B 43/262 |
| | | | | 53/385.1 |
| 6,073,942 | A * | 6/2000 | Heneveld, Sr. | B62B 5/00 |
| | | | | 280/47.35 |
| 6,644,210 | B1 * | 11/2003 | Pfleger | B66B 31/006 |
| | | | | 104/162 |
| 9,089,147 | B2 | 7/2015 | Maile | |
| 9,675,087 | B2 * | 6/2017 | Maile | F04C 2/344 |
| 2003/0222151 | A1 * | 12/2003 | Bretl | G06K 17/00 |
| | | | | 235/475 |
| 2007/0212202 | A1 * | 9/2007 | Koike | B65G 65/00 |
| | | | | 414/266 |
| 2009/0211711 | A1 * | 8/2009 | Auf Der Heide | A22C 11/125 |
| | | | | 156/383 |
| 2009/0242355 | A1 * | 10/2009 | Webster | B66B 29/005 |
| | | | | 198/301 |
| 2010/0109268 | A1 | 5/2010 | Koehler et al. | |
| 2011/0147164 | A1 * | 6/2011 | Webster | B66B 31/006 |
| | | | | 198/463.6 |
| 2012/0207566 | A1 * | 8/2012 | Maile | B65G 65/23 |
| | | | | 414/222.01 |
| 2014/0335788 | A1 * | 11/2014 | Schrader | H04B 7/24 |
| | | | | 455/41.2 |
| 2015/0344051 | A1 * | 12/2015 | Lenkman | B62B 3/02 |
| | | | | 248/638 |
| 2016/0338392 | A1 * | 11/2016 | Gillette | A23L 3/3589 |

FOREIGN PATENT DOCUMENTS

| | | | | |
|---|---|---|---|---|
| DE | 102005032678 A1 * | 1/2007 | | A22C 11/08 |
| DE | 102013107453 B3 * | 8/2014 | | B60D 1/02 |
| EP | 1238884 A1 * | 9/2002 | | A61G 12/001 |
| EP | 1889542 A1 * | 2/2008 | | A22C 17/0073 |
| EP | 1982894 A2 | 10/2008 | | |
| EP | 2090521 A1 | 8/2009 | | |
| EP | 2415856 A1 * | 2/2012 | | B01L 1/52 |
| EP | 2540531 A2 * | 1/2013 | | B60D 1/26 |
| FR | 2913853 A1 * | 9/2008 | | A22C 17/00 |
| FR | 3031334 A1 * | 7/2016 | | B62B 3/02 |
| JP | 2011-189769 A | 9/2011 | | |
| JP | 2011189769 A * | 9/2011 | | |
| JP | 2015096446 A | 5/2015 | | |
| KR | 20090132113 A * | 12/2009 | | |
| KR | 20130081586 A * | 7/2013 | | |
| KR | 101573788 B1 * | 12/2014 | | |
| SU | 544591 | 1/1977 | | |
| SU | 544591 A1 * | 1/1977 | | |
| WO | WO-2004040148 A1 * | 5/2004 | | E05C 19/14 |
| WO | WO-2008089570 A1 * | 7/2008 | | A22B 7/00 |
| WO | WO-2012154872 A2 * | 11/2012 | | B60D 1/02 |
| WO | WO-2013050916 A1 * | 4/2013 | | B60R 11/0252 |
| WO | WO-2014157307 A1 * | 10/2014 | | B62B 3/00 |

OTHER PUBLICATIONS

International Search Report and Written Opinion for International Application Namber PCT/EP2017/052591; dated May 22, 2017.
International Preliminary Report on Patentability for International Application No. PCT/EP2017/052591; dated May 9, 2018.

* cited by examiner

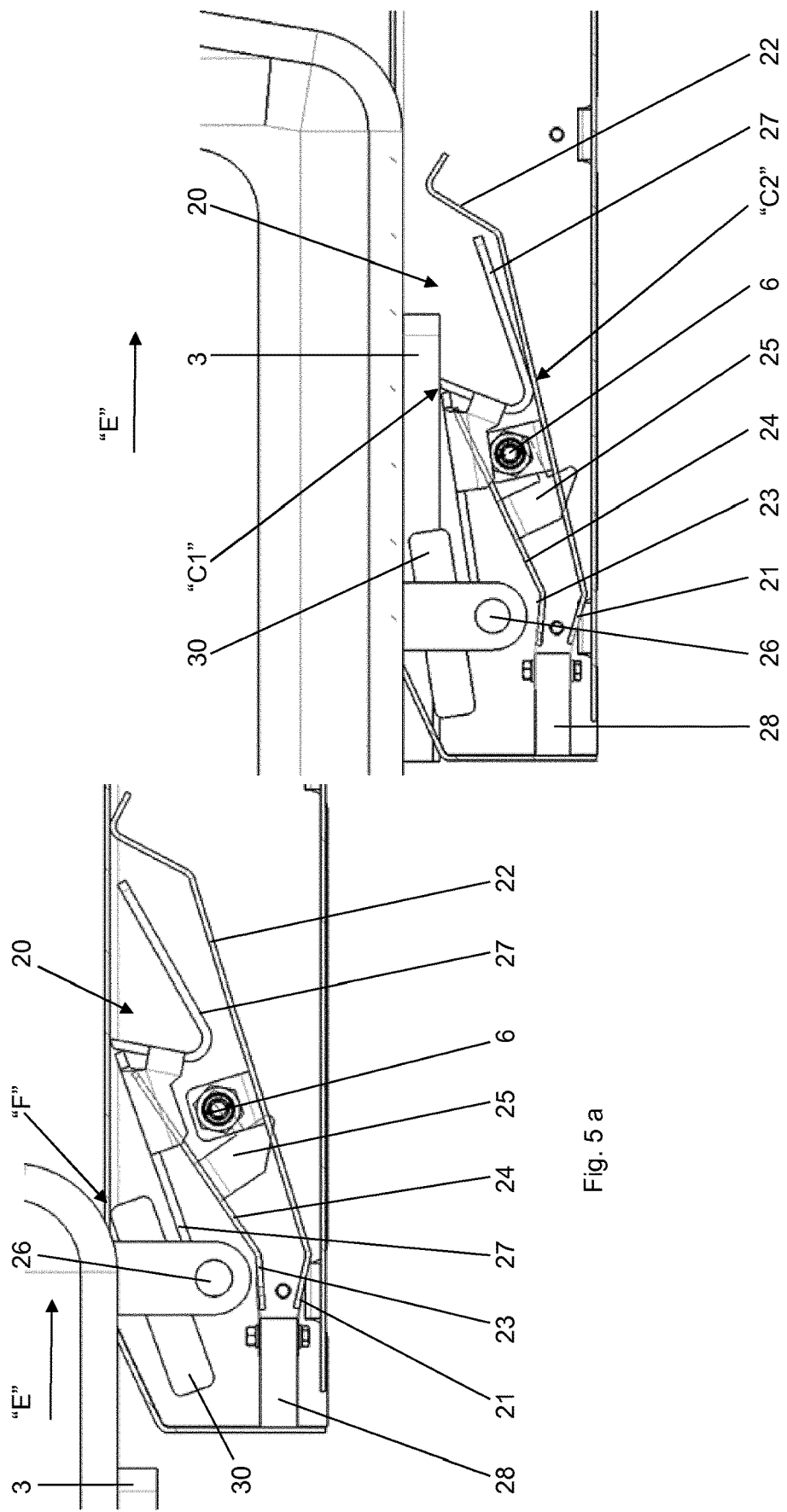

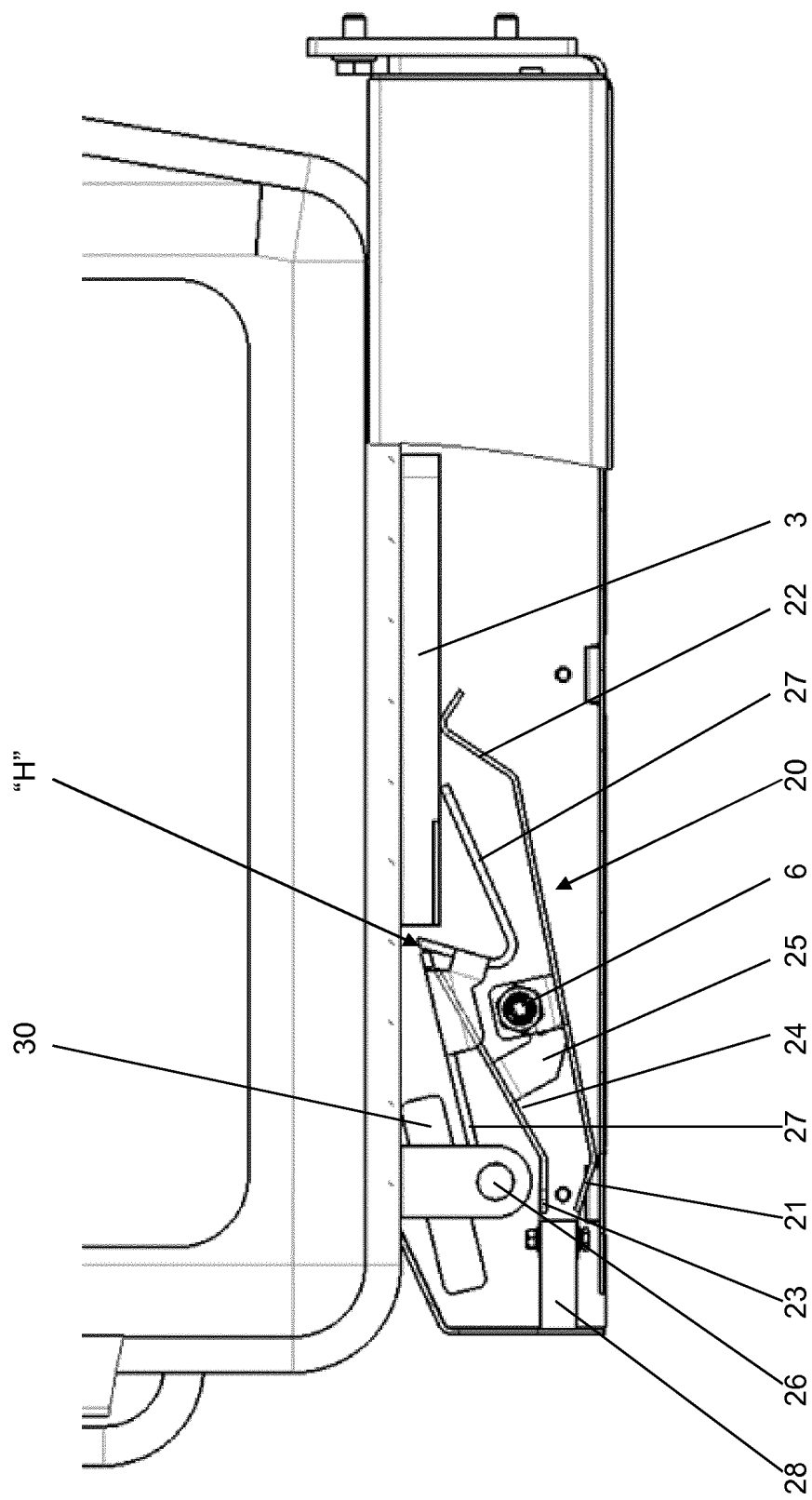

TROLLEY DETECTION AND SAFETY SYSTEM

PRIORITY

This application is a US National Stage Entry of PCT/EP2017/052591 filed on Feb. 7, 2017, and which claims priority to EP 16155656.8 filed on Feb. 15, 2016, all of which are hereby incorporated by reference herein for all purposes.

FIELD

This invention relates to a method to detect the connection between two food processing—, food-preparation and/or handling-devices, wherein one device comprises detection means with a sensor and sensor activation means. The invention further relates to a set with a first device and a second food processing—, food preparation and/or handling device, which are reversibly connected wherein the first device comprises a safety device with a sensor and an activation means.

BACKGROUND

Trolleys are widely used especially in food preparation, for example in combination with loaders, emulsifiers, mixers and/or grinders and/or with food-processing machines such as formers. Preferred food products are meat, poultry, fish, potatoes and/or vegetable products. Safe working and hygienic conditions are of great importance in the food industry. Hence it is essential to assure that the trolley is safely connected to another device, before it is, for example lifted and/or no trolley is connected to a device before it is opened. However, the safety systems and/or the methods according to the state of the art are easily circumvented and/or not robust.

SUMMARY

It was therefore the objective of the present invention to provide a method to detect the connection between two food processing- and/or food preparation devices which does not have the deficiencies of the methods according to the state in the art.

This problem is solved with a method to detect the connection between two food processing—, food-preparation and/or handling-devices, wherein one device comprises detection means with a sensor and sensor activation means and wherein during the connection, the sensor and the sensor activation means are both displaced, independently from each other, from a remote—into an activated position and vice versa.

The disclosure regarding this subject matter of the present invention also applies to the other subject matters and vice versa.

The present invention relates to a method to detect the connection between two food processing—, food-preparation and/or handling-devices (in the following "devices"), wherein at least one of the two devices comprises detection means with a sensor and sensor activation means. The second device is preferably a trolley, in which the food product is transported. The first device is preferably a food processing—, food-preparation—and/or handling-machine, like a mixer, cutter, grinder etc. The sensor and the activation means are preferably connected to the first device. Preferably, the sensor is a so-called approach sensor, which detects whether the sensor is approached by the activation means. Preferably, the sensor emits for example electromagnetic- and/or sound-waves, which are sensed by a receiver or reflected back to the sensor. The receiver or the reflector are examples for the activation means. Due a signal from the sensor or the activation means, a control system knows that the devices are in the correct connected position relative to each other. This information allows and/or blocks certain activities of the device. For example, a trolley cannot be lifted unless the trolley is in a certain position relative to a mixer or cutter. Or a first device cannot be opened as long as a second device is still connected. The person skilled in the art understands that the sensor/activation means can also be based on a different physical principal as long as it comprises a sensor and the sensor activation means which can be moved independently from each other.

According to the present invention, the sensor and the sensor activation means can both be displaced, independently from each other, from a remote position, in which there is no interaction between two devices, into an activated position, in which there is an interaction between two devices and vice versa. The displacement is preferably carried out during the connection of the two devices. More preferably, the sensor and the sensor activation means are moved by the motion of the two devices relative to each other during their connection. Only when the sensor and the sensor activation means are both in the activated position, a corresponding signal will be provided to a control unit, which then knows that the two devices are in the correct position relative to each other. Due to the motion of both, the sensor and the sensor activation means from a remote- to an activated position it is assured that the system cannot be manipulated.

According to another inventive or preferred embodiment of the present invention, the sensor and the sensor activation means can be displaced relative to one another from a remote—via an intermediate into an activated position and vice versa, wherein during the displacement the distance between the sensor and the activation means first increases and then decreases.

The disclosure regarding this subject matter of the present invention also applies to the other subject matters and vice versa.

Due to this movement pattern, it is assured that the connection of the two devices takes place according to the correct movement of the tow devices relative to each other.

Preferably, the sensor and/or the activation means is turned around a pivot from the remote to the activated position and vice versa. The turning can take place by a movement of a lever relative to the pivot and/or by bending a lever. Preferably, the pivot for the sensor and the sensor activation means is the same. However, preferably, the length of the respective lever arms is different. Preferably, one of the levers comprises locking means to mechanically lock one device at the other.

Preferably, the sequence of the motion of the sensor and the sensor activation means is different.

Preferably, the first device is locked at the second device when the sensor and/or its activation means are in its activated position.

Another subject matter of the present invention is a set with a first device and a second food processing—, food-preparation and/or handling-device, which are reversibly connected wherein the first device comprises a safety device with a sensor and a sensor activation means and wherein the sensor and the sensor activation means are both moved by the second device from a remote- to an activated position.

The disclosure regarding this subject matter of the present invention also applies to the other subject matters and vice versa.

In the remote position, the sensor and the sensor activation means do not interact. Hence, the control system of at least one of the devices knows that no other device is connected to it. In the activated position, however, the sensor and the sensor activation means interact. The sensor activation means for example, reflects a sonic or electromagnetic wave sent out by the sensor and hence the control system knows that two devices are connected and in the right position relative to each other.

According to another preferred or inventive subject matter of the present invention, the sensor and the sensor activation means are displaced by the second device relative to one another from a remote—via an intermediate into an activated position and vice versa, wherein during the displacement the distance between the sensor and the sensor activation means first increases and then decreases.

The disclosure regarding this subject matter of the present invention also applies to the other subject matters and vice versa.

Preferably, the sensor and the activation means are provided at a lever. Each lever is preferably connected to the frame of one device. Preferably, each lever is rotatable around a pivot and/or elastically bendable.

Preferably, the length between one end of the lever and the sensor and the end of one lever and the activation means is different. Due to this difference, the motion path from the remote to the activated position of the sensor and the sensor activation means is different.

According to a preferred embodiment of the present invention, one lever is connected to and/or comprises a locking means which locks the device. During the lever's motion and/or at the end of the lever's motion, a locking device, for example a hook, is brought from a remote to a locking position, in which it hinders the devices from disconnecting. This assures that the two devices do not only take up the correct position relative to each other, but also remain in this position.

Preferably, the safety device is surrounded by the cover of the device. This protects the sensor and/or sensor activation means from being damaged. However, it also assures that the sensor and/or the activation means are manipulated.

Preferably, the sensor and/or the sensor activation means are provided such that at least one of them, preferably both move into the remote position by gravity- and/or spring-force, particularly, as soon as the connection between the two devices is reversed. This preferred embodiment also assures that the sensor and the sensor activation means are each in the remote position when the connection between the two devices starts.

According to a preferred embodiment of the present invention, at least one device preferably both devices comprise identification means. The identification means is preferably an RFID, more preferably a read/write-RFID, which comprises information to clearly identify it. Hence, as soon as one device approaches another device, at least one device reads out the information from the identification of the other device to assure that the approached or approaching device is the correct device. This avoids that an operator makes a wrong connection between two devices. More preferably, data can be written and stored on the identification, for example data about the product in a trolley and how it has been treated so far. This data can be read out and complemented by the device to which the trolley is connected so that there is a treatment history of the food in the trolley on the identification means.

Additionally, or alternatively, the cleaning of the respective device can be stored in the identification. Preferably, the machine and/or the process cannot be started unless a RFID is recognized by a control system.

A preferred solution to meet the safety requirements is achieved with the inventive trolley detection system wherein the detection means and safety mechanisms will be positioned such that they are only limited visible and are as much as possible concealed within the structure. The safety mechanism is designed such that it is hard to bypass the mechanism from the outside of the mixer. Only by willful removing of frame and covering parts the detection means and safety mechanism can be reached. Additionally, the safety system should work properly such that there is no need to circumvent and bypass the safety system.

BRIEF DESCRIPTION OF THE DRAWINGS

FIG. 5a illustrates a safety mechanism in its remote position before the trolley is approaching the mixer.
FIG. 5b illustrates a trolley partially entering the mixer.
FIG. 5c illustrates the trolley is in its loading position.

DETAILED DESCRIPTION

Figure 1A:
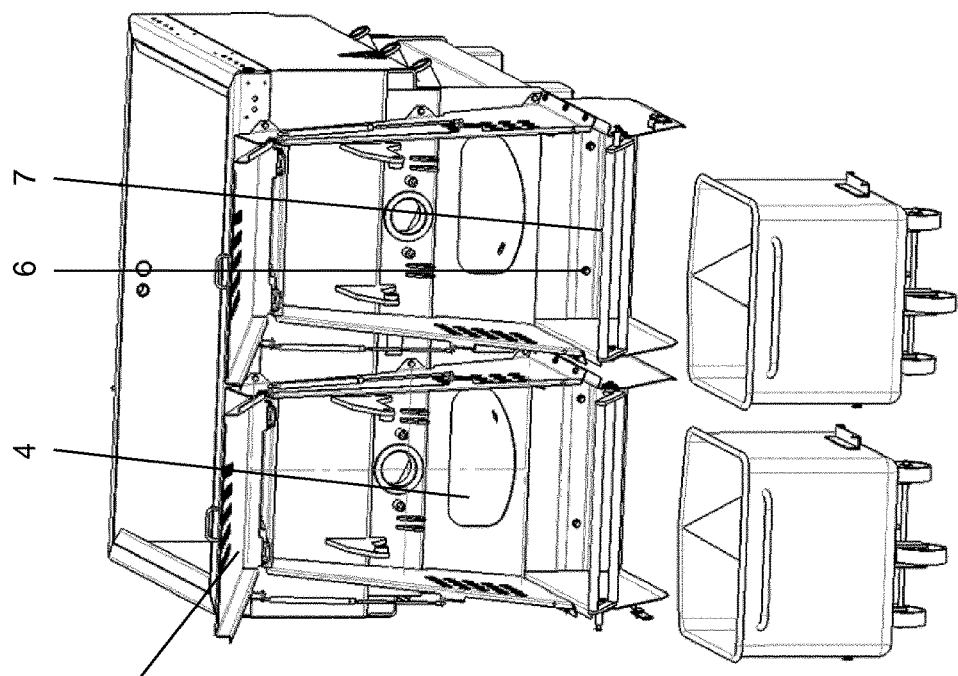
FIG. 1a is a perspective view of a mixer and two trolleys.
Figure 1B:
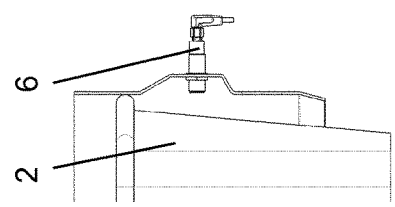
FIG. 1b is a partial side view of a trolley and sensor.
Figure 1C:
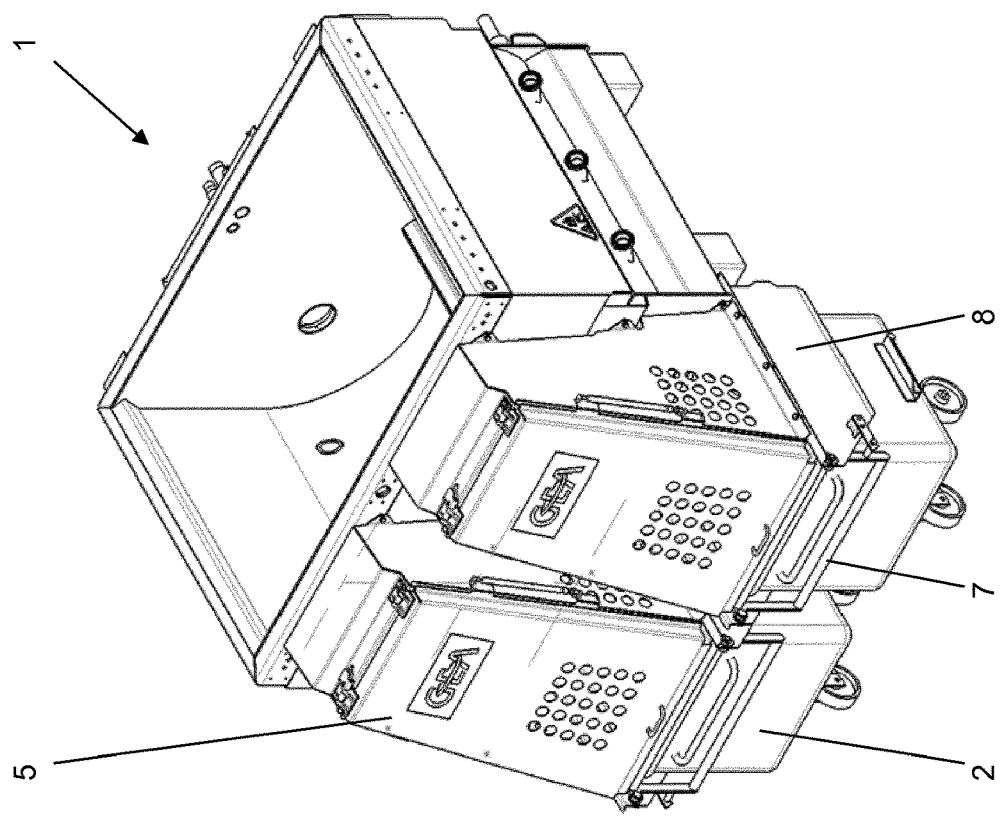
FIG. 1c is a perspective view of a mixer and two trolleys.
Figure 2:
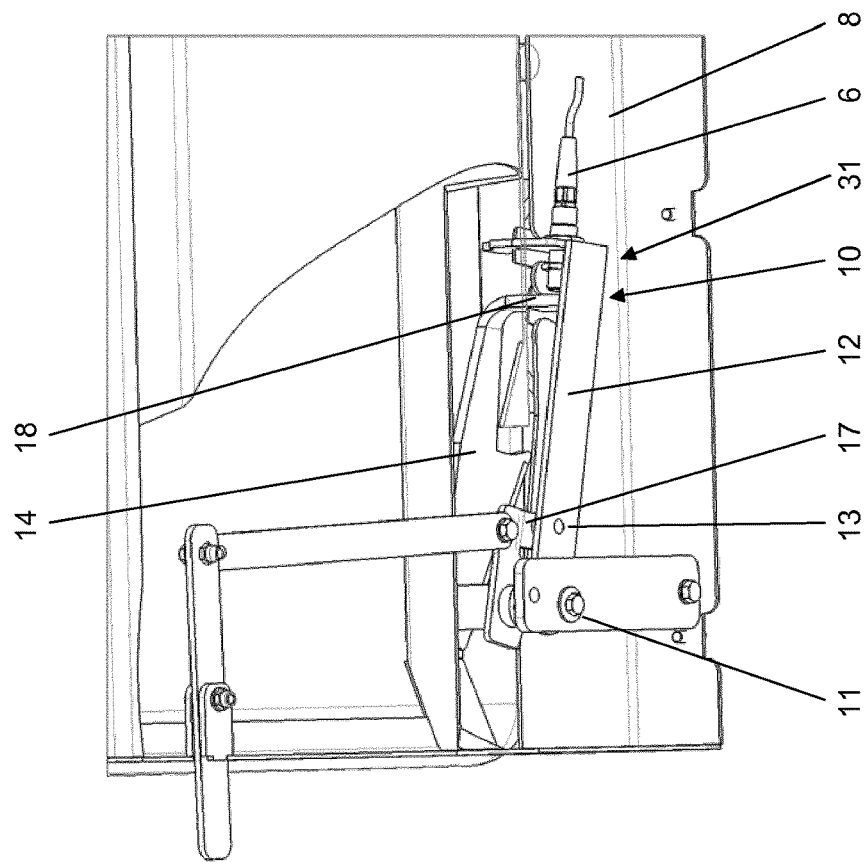
FIG. 2a is a perspective view of a mixer and two trolleys.
FIG. 2b illustrates a safety mechanism.
Figure 2:
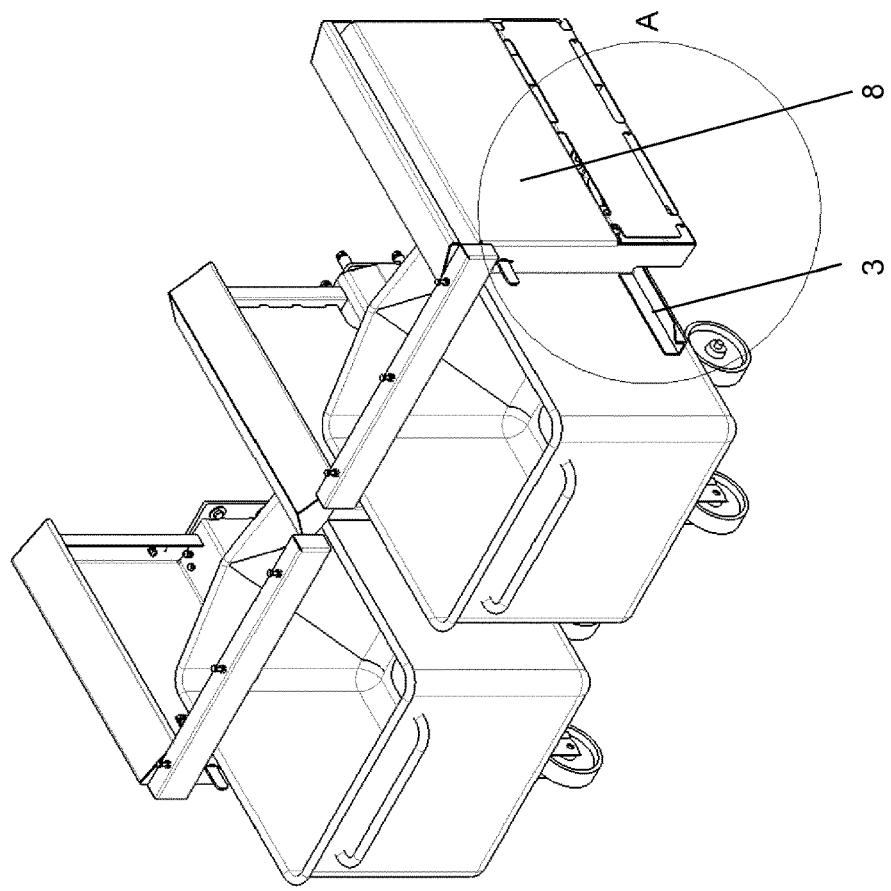
Figure 3:
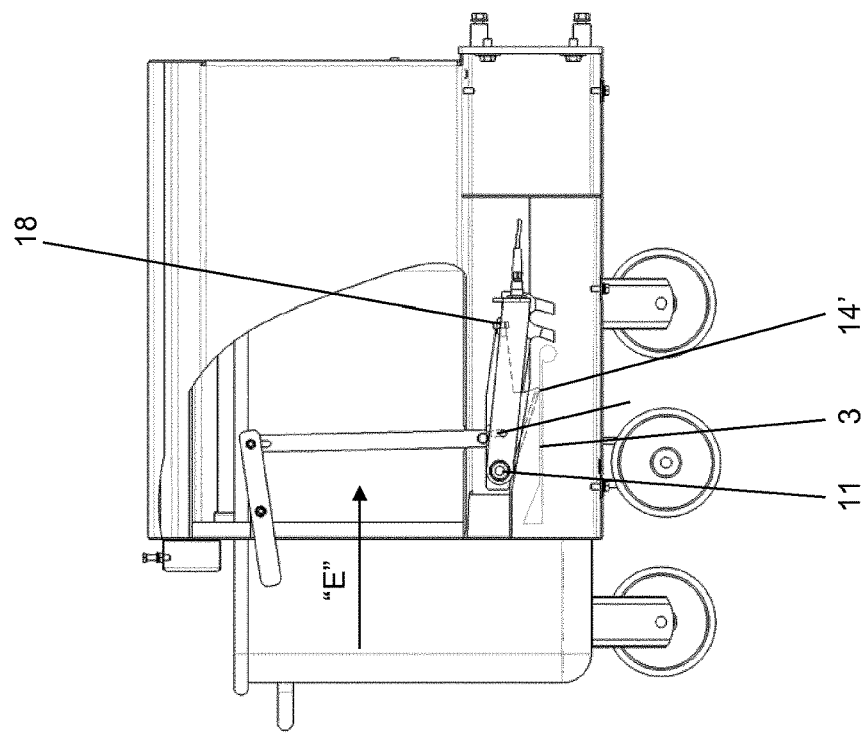
FIG. 3a illustrates a trolley entering the mixer.
FIG. 3b illustrates the trolley at least partially entered into the mixer.
FIG. 3c illustrates the trolley in a loading position.
FIG. 3d illustrates the safety mechanism in a remote position.
Figure 3:
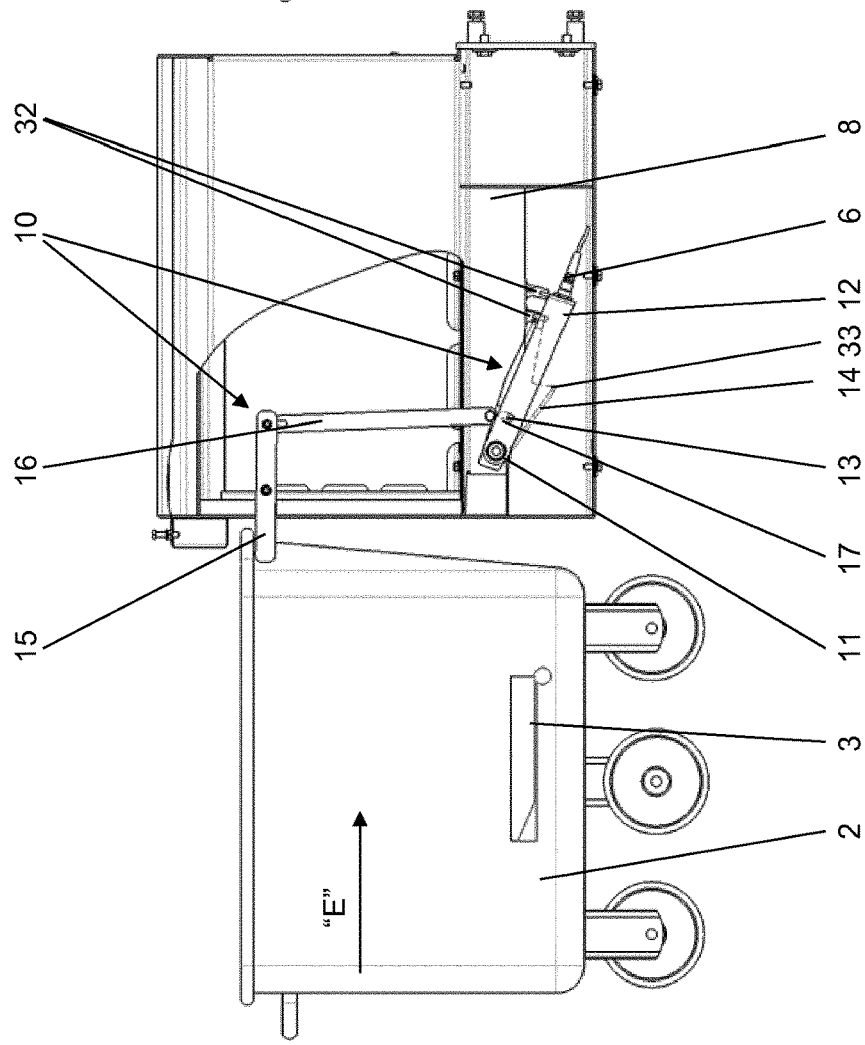
Figure 3:
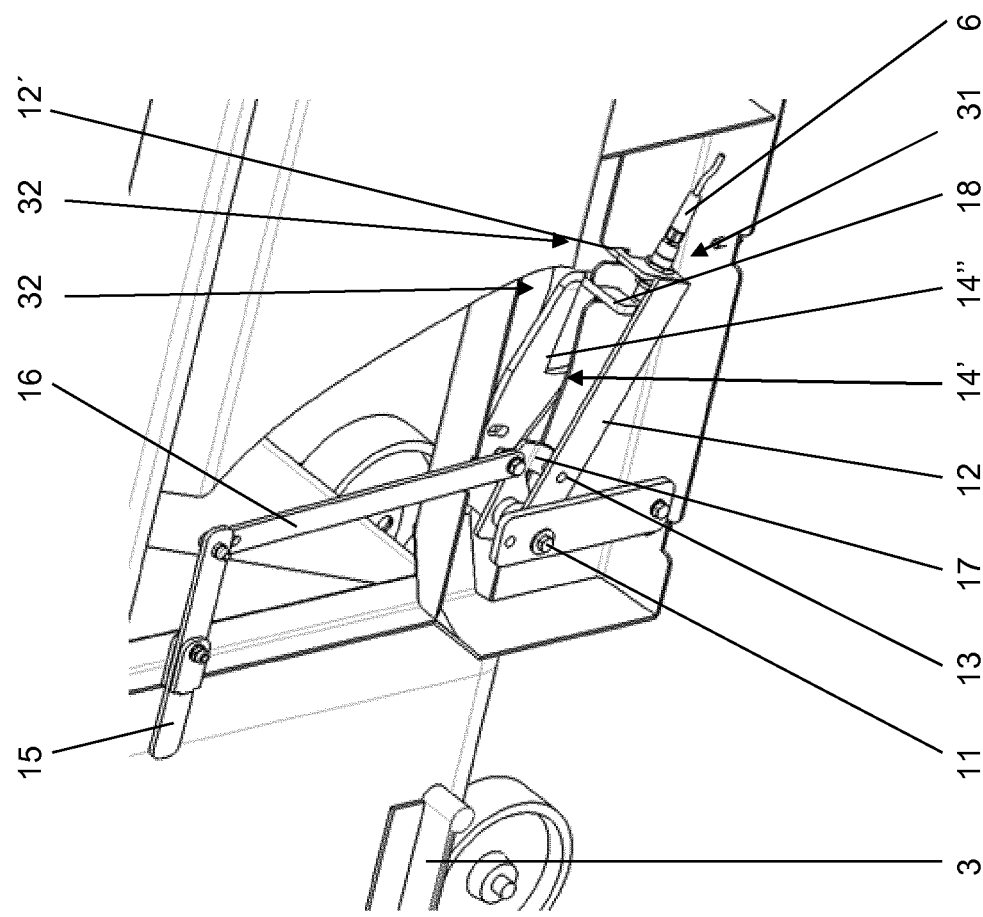
Figure 3:
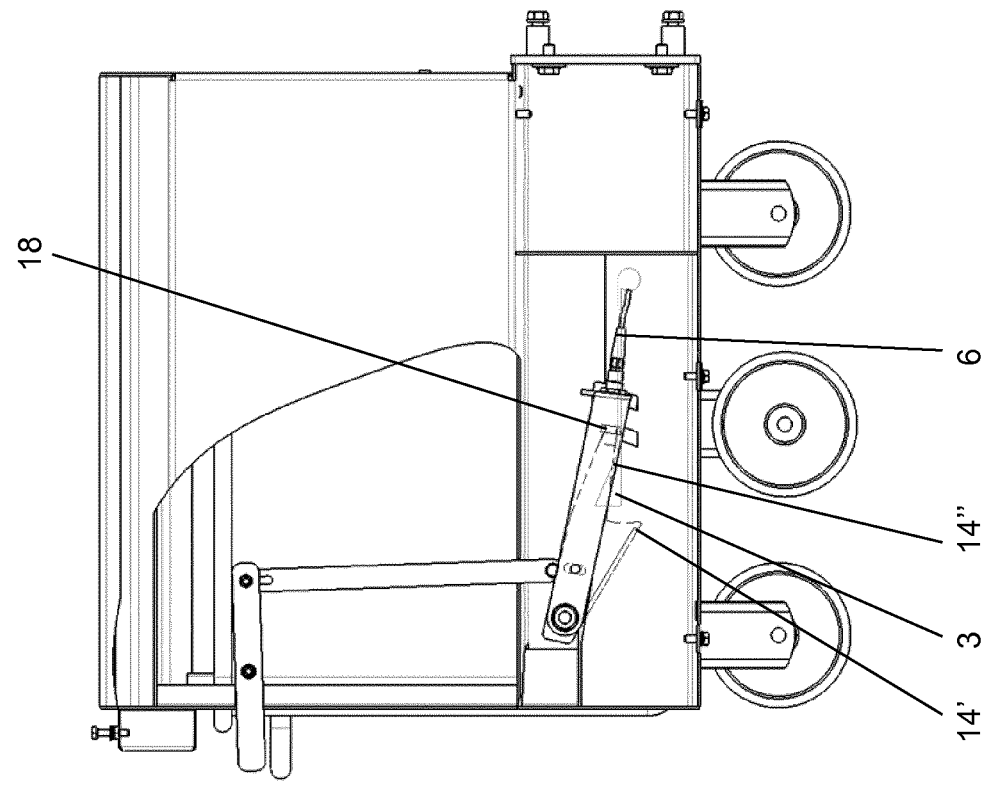
Figure 4:
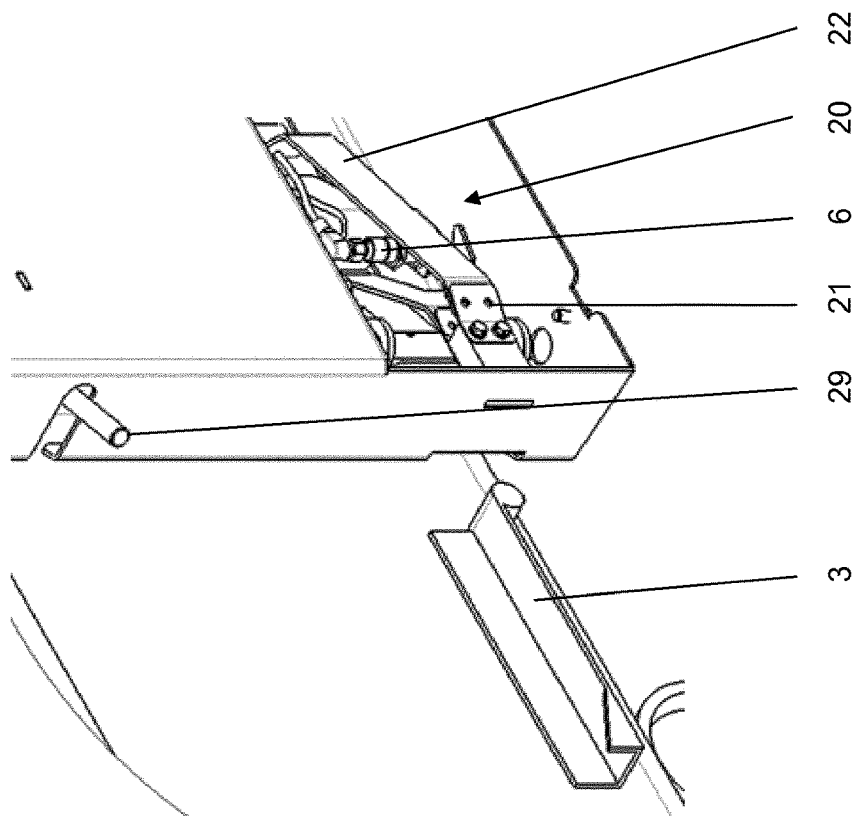
FIG. 4a is a partial perspective view of a mixer and two trolleys.
FIG. 4b illustrates a trolley guide as part of the trolley aide safety mechanism.
Figure 4:
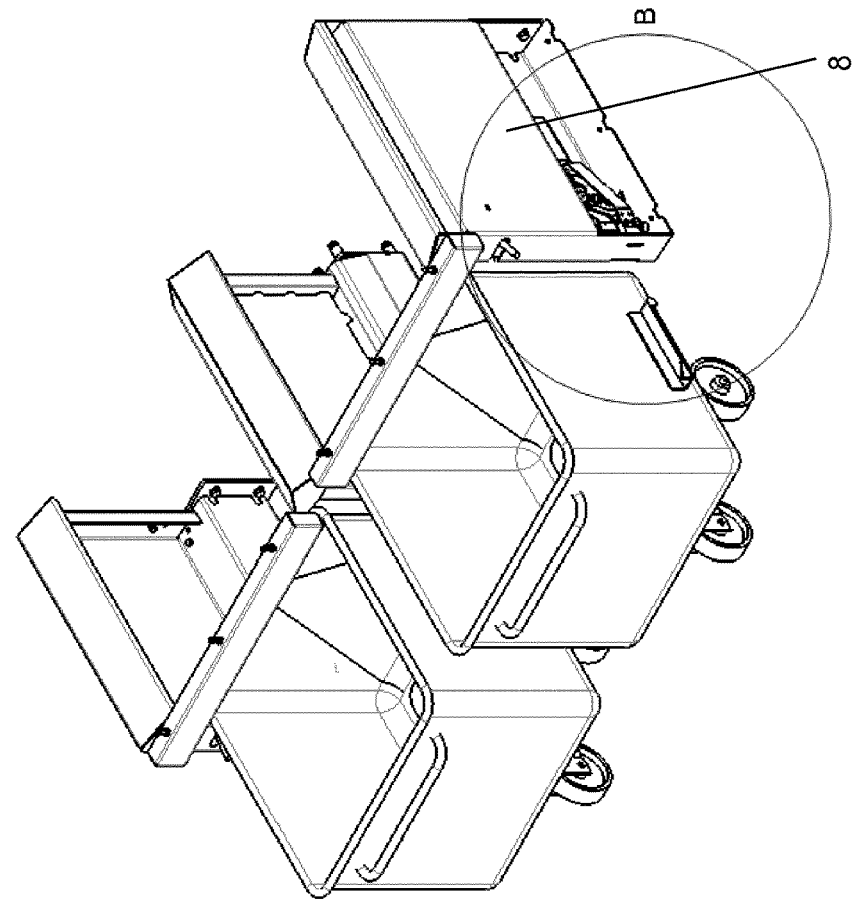

FIG. 1a-1c shows the state of the art. In the present case, a mixer 1 is provided to which two trolleys 2 are connected. On the side where the trolleys 2 are positioned, covers 4 are provided above openings of the mixer to prevent that the inside of the mixer can be reached for example by an operator. Furthermore, covers 5 to cover the trolleys and locking means 7 which prevent the trolley from moving away from its loading position are provided. The detection means is (are) in the present case one, preferably two stationary approach sensor(s) 6 per trolley, which senses whether a trolley is connected to the mixer or not. There are multiple conditions which have to be fulfilled before an operator is able to start the mixer, i.e. covers 4 and 5 need to be in the right position. Additionally, at least one pair of two sensors 6 has to be activated, which, in the present case, takes place by moving a trolley in front of the sensors 6, which activates the sensor. In this case the safety system assumes that operation is safe so that the operator is able to start the mixer and/or to approach the mixer. However, this safety system is easily bypassed, for example by covering the sensors 6 permanently with an activation means, for example a reflecting film. Since also in this case the safety system assumes that a trolley is present, for example the cover 4 can be opened which is a safety risk.

FIGS. 2a-3d show a first embodiment of the inventive set, which comprises a first device 1 and a second device 2. The first device 1, here a mixer, is only partially shown and comprises a frame with a cover 8. The second device is in the present case a trolley. The trolley 2 is provided with a guide 3 which guides and/or positions the trolley within the first device. These guides are in most cases a standardized part of the trolley. As will be explained later on this guide can be utilized to activate the detection means 31. The present invention has the advantage that even a trolley can be used which does not comply the standardized design.

FIGS. 2b-3d depicts the safety mechanism 10 of the set which comprises a first lever 14 and a second lever 12, which are in the present case both pivotable around a pivot, here an axis 11. The first lever comprises a first part 14" which is located closer to the pivot 11 and a second part 14" which comprises the activation means 18, here for example a reflecting zone. The first part 14' comprises a projection, preferably a hook 33. The second lever is also pivotable around the pivot 11 and comprises at its end, which is opposite from the pivot the sensor 6. The two levers 12, 14 are separated by a cover 8, wherein lever 14 is on the same side of the cover on which the entry of the trolley is located and lever 12 is on the opposite side of the cover 8. This lever comprises two slots 32 (please compare 3d), through which a section of each lever 12, 14 extends. In the present case, the activation means 18 of lever 14 and a projection 12" of lever 12 extend through the cover. The trolley has at least one side a trolley guide 3, which does not extend over its entire length. The trolley guide 3 of the entering trolley interacts with both sections 14' and 14" of lever 14 as well as projection 12" of lever 12. However, the person skilled in the art understands that also another parts of the trolley, like the bottom of the trolley can interact with the safety mechanism 10. Due to the coverage of activation, means 18 and sensor 6 by a cover, a manipulation of one or both is almost impossible.

FIGS. 3a-3d show in more detail the working principle of safety mechanism 10. Arrow "E" in FIG. 3a is showing trolley 2 entering the mixer 1. Levers 12, 14 of the safety mechanism 10 are, due to gravity forces and/or additional means, forced into their remote position which is in the present case its lowest possible position. It can be clearly seen, that in this position, the activation means 18 and the sensor 6 do not have sufficient overlap so that the sensor is not activated in this position. The remote position of the levers 12, 14 is for example defined by the lower end of slots 32 (see FIG. 3a or 3d). In FIG. 3b the trolley enters at least partially the mixer. Thereby, trolley guide 3 interacts with the downward facing projection 14' so that the lever 14 rotates counterclockwise around pivot 11. With ongoing entry of the trolley 2, the trolley guide 3 also starts to interact with lever 12 and also rotates this lever 12 counterclockwise, however independently from lever 14. The safety mechanism 10 is designed such that during this stage activation means 18 does not cover sensor 6, so that so far still no activation of the sensor 6 takes place.

In FIG. 3c the trolley is in its loading position. Now, not projection 14' but the second section 14" of lever 14 is resting on trolley guide 3. Hence, lever 14 has rotated clockwise with respect to FIG. 3b so that the activation means 18 are now in line with the sensor 6 which is consequently activated. A control system connected to the safety mechanism now knows that the trolley is in its loading position. In the present case, the projection 14" is designed as a hook 33 which now mechanically prevents the trolley from moving away from its loading position.

In case mixer production is finished and the trolley 2 shall be removed from mixer 1, the trolley can be unlatched via release handle 15 and arm 16, which are connected to lever 14 and rotate lever 14 counterclockwise around hinge point 11, hook 33 is displaced above trolley guide 3 with the result that the trolley 2 can be removed successively from the mixer as shown in FIG. 3d.

FIGS. 4a-5c show a second embodiment of the inventive trolley detection system. Also in this embodiment, the trolley detection system will be designed such that even a trolley can be used which does not comply the standard with respect to its dimension. FIG. 4b depicts trolley guide 3 as part of the trolley and safety mechanism 20 which is an assembly consisting of multiple parts such as a spring, here a sheet metal spring 21, lever 22 connected to spring 21 and a sensor 6, in this embodiment an approach sensor.

FIG. 5a shows safety mechanism 20 in its remote position before the trolley is approaching the mixer. The approach of the trolley is again depicted by arrow "E". Lever 27 is pivotable around the pivot 26. Another lever 24 is connected to a spring 23 and forced by this spring into its remote position. The activation means 25 is fixedly connected to lever 24 and hence also in its remote position. Another lever 22 is provided at the end of another spring 21 and forced into its remote position by this spring. The sensor 6 is fixedly connected to lever 22 and hence in FIG. 5a also in its remote position. Both levers 22, 24 as well as the sensor 6 and the activation means 25 are at least essentially surrounded by a cover 8. Both, spring 23 and spring 21 can be directly connected to the frame of the mixer by extension 28. In the remote position, activation means 25, connected to lever 24, do not cover sensor 6. The levers are all positioned in the most extreme position which is limited by edge "F" of stop strip 30.

In FIG. 5b the trolley enters at least partially the mixer. Trolley guide 3 is forcing lever 27 (see contact line "C1") to displace by rotating in a clockwise direction around hinge point 26. Via sheet metal spring 23, lever 24 is forcing lever 27 to keep in contact with trolley guide 3. Lever 22 is forced to keep in contact with lever 27 (see contact line "C2") by sheet metal spring 21. Activation means 25, connected to lever 24, will not cover detection means 6, while the trolley enters the mixer.

In FIG. 5c the trolley is in its loading position. Contact line "C1" is no more in contact with the trolley guide 3 and spring 23 forces lever 27 to rotate counterclockwise around hinge point 26 with result that lever 27 will act as a hook with respect to trolley guide 3. In this position the trolley is prevented from moving away from its loading position. In this trolley position, activation means 25 is covering the sensor 6 such that the safety requirement regarding the position of the trolley is fulfilled.

In case mixing is finished and the trolley shall be removed, the trolley can be unlatched via release handle 29, see FIG. 4b. Lever 27 will rotate clockwise around hinge point 26 until contact line "H" is displaced beside trolley guide 3 with result that the trolley can be removed successively from the mixer.

All described embodiments and identification/recognition systems are not limited to the use of a trolley in combination with a mixer or in combination with meat but can be used in a broad sense in combination with Loaders/Discharge devices in all kind of line setups (in front of preparation, processing or packaging lines, etc.), in combination with preparation equipment (Emulsifiers, Cutters, Grinders, Tumblers, etc.), in combination with processing equipment (Forming, Portioning, etc.) or in combination with packaging equipment (Depositors, etc.) for meat, poultry, fish, potatoes and vegetable products.

LIST OF REFERENCE SIGNS 1 first device, mixer
2 second device, trolley
3 trolley guide
4 cover
5 cover
6 detection means, approach sensor
7 locking means
8 cover
10 Connection/safety device
11 hinge point, pivot
12 lever, second lever
12' projection
13 pin
14 lever, first lever
14' first part of the lever 14
14" second part of lever 14
15 release handle
16 arm
17 hook
18 sensor activation means, strip, reflecting strip
20 Connection/safety device
21 sheet metal spring
22 lever connected to 21
23 sheet metal spring
24 lever connected to 23
25 activation means
26 hinge point, pivot
27 lever
28 part of frame extension 8
29 release handle
30 stop strip
31 detection means
32 slot
33 hook

The invention claimed is:

1. A method comprising:
detecting a connection between a device and a trolley, wherein the trolley comprises a trolley guide;
wherein the device comprises detection means with a lever, a sensor, and sensor activation means, and
wherein during the connection, the sensor and the sensor activation means are both displaced by the trolley guide, independently from each other, from a remote position into an activated position, and vice versa.

2. The method according to claim 1, wherein the sensor and the sensor activation means are displaced relative to one another via an intermediate from the remote position into the activated position, and vice versa, and
wherein during the displacement, a distance between the sensor and the sensor activation means first increases and then decreases.

3. The method according to claim 1, wherein the sensor and/or the sensor activation means is pivoted from the remote position to the activated position, and vice versa.

4. The method according to claim 1, wherein the device is locked at the trolley when the sensor and/or the sensor activation means are in the activated position.

5. Set of a device and a trolley,
wherein the trolley comprises a trolley guide,
wherein the device comprises detection means with a lever, a sensor, and a sensor activation means,
wherein during a connection, the sensor and the sensor activation means are both displaced by the trolley guide, independently from each other, from a remote position into an activated position, and vice versa.

6. The set according to claim 5, wherein during the displacement, a distance between the sensor and the sensor activation means first increases and then decreases.

7. The set according to claim 5, wherein the sensor and the sensor activation means are provided at the lever, respectively.

8. The set according to claim 7, wherein a length between an end of the lever and the sensor is different than a length between the end of the lever and the sensor activation means.

9. The set according to claim 5, wherein the lever is connected to and/or comprises a locking means, which locks the trolley and the device.

10. The set according to claim 5, wherein a safety device is surrounded by a cover.

11. The set according to claim 5, wherein the sensor and/or the sensor activation means are forced into the remote position by gravity or spring-force.

12. The set according to claim 5, wherein the device and/or the trolley comprise identification means.

13. The method according to claim 1, wherein the device is a mixer.

14. The method according to claim 1, wherein a connection is detected between the device and two trolleys.

15. The set according to claim 5, wherein the device is a mixer.

* * * * *